US012065021B2

(12) United States Patent
Gaile et al.

(10) Patent No.: US 12,065,021 B2
(45) Date of Patent: Aug. 20, 2024

(54) SELF-SUPPORTING VAPOR CYCLE REFRIGERATION SYSTEM FOR AN AIRCRAFT

(71) Applicant: Lilium eAircraft GmbH, Wessling (DE)

(72) Inventors: Alfred Gaile, Leutkirch (DE); Axel Dietrich, Gilching (DE)

(73) Assignee: Lilium eAircraft GmbH, Wessling (DE)

( * ) Notice: Subject to any disclaimer, the term of this patent is extended or adjusted under 35 U.S.C. 154(b) by 376 days.

(21) Appl. No.: 17/670,846

(22) Filed: Feb. 14, 2022

(65) Prior Publication Data

US 2022/0266660 A1 Aug. 25, 2022

(30) Foreign Application Priority Data

Feb. 19, 2021 (EP) .................................. 21158240

(51) Int. Cl.
*B60H 1/00* (2006.01)
*B60H 1/32* (2006.01)
(Continued)

(52) U.S. Cl.
CPC ........... *B60H 1/3229* (2013.01); *B64D 13/06* (2013.01); *B64D 13/08* (2013.01)

(58) Field of Classification Search
CPC ...... B60H 1/3229; B64D 13/06; B64D 13/08; B64D 2013/0603; B64D 2013/0674; Y02T 50/40; F25B 1/005; F25B 49/02
See application file for complete search history.

(56) References Cited

U.S. PATENT DOCUMENTS 2,164,545 A * 7/1939 Rogers .................. B64D 27/06
123/41.1
3,583,658 A * 6/1971 Herweg ................. B64D 13/08
62/243

(Continued)

FOREIGN PATENT DOCUMENTS

CN 2828624 Y 10/2006
CN 201697247 U 1/2011
(Continued)

OTHER PUBLICATIONS

Office Action Issued for Chinese Application No. 202210026616, dated Apr. 25, 2023. Machine Translation Included.
(Continued)

*Primary Examiner* — Phutthiwat Wongwian
*Assistant Examiner* — Sherman D Manley
(74) *Attorney, Agent, or Firm* — Meunier Carlin & Curfman LLC

(57) ABSTRACT

A vapor cycle refrigeration system for an aircraft comprises a compressor, a condenser unit with a condenser radiator, a condenser fan and a condenser air duct configured to direct a stream of air generated by the condenser fan through the condenser radiator, an expansion device, an evaporator unit with an evaporator radiator, an evaporator fan and an evaporator air duct configured to direct a stream of air generated by the evaporator fan through the evaporator radiator, and a piping system connecting the compressor, the condenser radiator, the expansion device and the evaporator radiator in a closed circuit for a refrigerant, wherein each of the compressor, the condenser radiator, the condenser fan, the expansion device, the evaporator radiator, the evaporator fan and the piping system is fully supported directly or indirectly by at least one of the condenser air duct and the evaporator air duct such that the system is self-supporting.

10 Claims, 3 Drawing Sheets

(51) Int. Cl.
  *B64D 13/06*   (2006.01)
  *B64D 13/08*   (2006.01)

(56) References Cited

U.S. PATENT DOCUMENTS

| | | | |
|---|---|---|---|
| 4,361,014 A | 11/1982 | Blain | |
| 4,763,859 A * | 8/1988 | Biagini | B64D 13/08 62/382 |
| 7,543,458 B1 * | 6/2009 | Wurth | B64D 13/06 62/401 |
| 9,062,909 B2 * | 6/2015 | Lu | F25D 17/06 |
| 9,902,505 B2 * | 2/2018 | Dahl | B64F 1/362 |
| 10,021,970 B2 * | 7/2018 | Lu | B64D 11/04 |
| 10,266,276 B2 | 4/2019 | Beuning et al. | |
| 2005/0235674 A1 * | 10/2005 | Ozaki | F04B 39/0044 62/298 |
| 2009/0107163 A1 * | 4/2009 | Lu | F25D 17/06 62/291 |
| 2010/0224726 A1 * | 9/2010 | Lu | F25D 17/06 62/507 |
| 2013/0277009 A1 * | 10/2013 | Army | B64D 13/06 165/41 |
| 2015/0059385 A1 | 3/2015 | Burd | |
| 2015/0267929 A1 * | 9/2015 | Kim | F24F 11/30 62/89 |
| 2020/0056803 A1 | 2/2020 | Vandyke et al. | |
| 2020/0140095 A1 | 5/2020 | Bammann et al. | |
| 2023/0050364 A1 * | 2/2023 | Yu | F24F 1/027 |

FOREIGN PATENT DOCUMENTS

| | | |
|---|---|---|
| CN | 104006469 A | 8/2014 |
| CN | 105333576 A | 2/2016 |
| CN | 205606849 U | 9/2016 |
| EP | 2 921 794 A2 | 9/2015 |
| EP | 3 450 319 A1 | 3/2019 |
| EP | 3 613 579 A1 | 2/2020 |
| JP | 2003042480 A | 2/2003 |

OTHER PUBLICATIONS

International Search Report and Written Opinion issued for Application No. PCT/EP2022/052303, dated May 2, 2022.

European Search Report for EP 21 158 240.8. 5 pages. Mailed Aug. 6, 2021.

\* cited by examiner

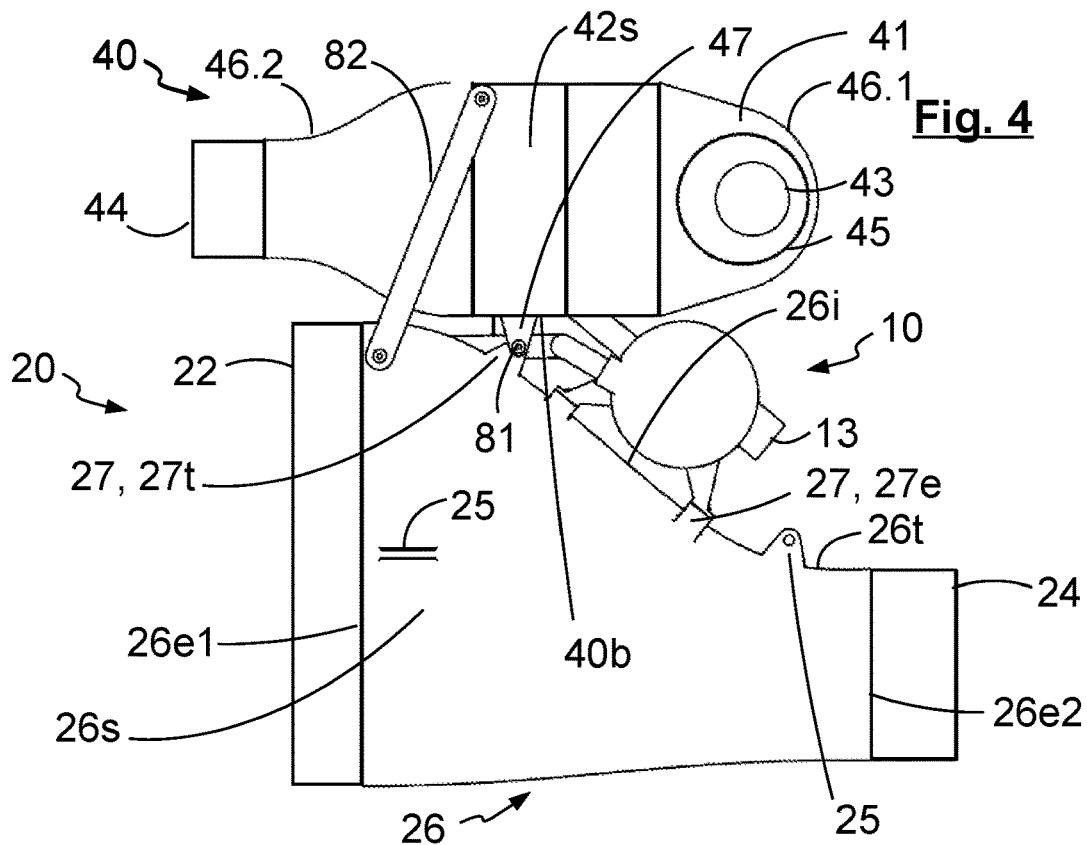

SELF-SUPPORTING VAPOR CYCLE REFRIGERATION SYSTEM FOR AN AIRCRAFT

In particular, the present invention relates to a vapor cycle refrigeration system, in short VCR system, for an aircraft, the system comprising: a compressor, a condenser unit with a condenser radiator, a condenser fan and a condenser air duct configured to direct a stream of air generated by the condenser fan through the condenser radiator, an expansion device, an evaporator unit with an evaporator radiator, an evaporator fan and an evaporator air duct configured to direct a stream of air generated by the evaporator fan through the evaporator radiator, and a piping system connecting the compressor, the condenser radiator, the expansion device and the evaporator radiator in a closed circuit for a refrigerant.

In conventional VCR systems, the different system components as listed above are arranged on and supported by a separate frame made from metal tubes which is then fixed to the aircraft. As an alternative, it is known to use a sheet metal box on which the components are supported.

Against this background, the object of the invention is to reduce the weight of the system which will in turn reduce the fuel consumption and increase the travel range or alternatively will increase the payload of the aircraft in which the system is used.

This object is solved by designing the VCR system in such a manner that each of the compressor, the condenser radiator, the condenser fan, the expansion device, the evaporator radiator, the evaporator fan and the piping system is fully supported, directly or indirectly, by at least one of the condenser air duct and the evaporator air duct in such a manner that the system is self-supporting.

The solution according to the invention saves a significant amount of weight by reducing the material amount for structural parts and by components topology providing favorable conditions for high performance compounds. In particular, a separate frame or box can be dispensed with, as a necessary system component is used as a base component that additionally assumes the supporting function of the conventional frame or box.

In essence, the transition from conventional VCR systems to the solution according to the invention is comparable to the Formula 1 change from tubular frames to the carbon fiber composite monocoque.

Of course, the VCR system can comprise additional components, in particular a receiver dryer provided between the condenser radiator and the expansion device. In this case, also each of the additional components is fully supported, directly or indirectly, by at least one of the condenser air duct and the evaporator air duct in such a manner that the system is self-supporting.

In some embodiments, the expansion device can comprise an expansion valve, in particular a thermal expansion valve. However, in other embodiments, also an expansion turbine can be used.

In particular, the condenser air duct connecting the condenser radiator and the condenser fan, due to its large surface required to convey a sufficient amount of air, is especially suitable to be used as a base component on which the other components can be mounted without having to add a significant amount of material.

Components mounted on the respective base component may be used as a supplemental structural element to mount other parts which are thus indirectly supported by the base component.

According to a particular embodiment, each of the compressor, the condenser radiator, the condenser fan, the expansion device, the evaporator radiator and the evaporator fan is fully supported either by the condenser air duct or by the evaporator air duct so that the system is separable into two self-supporting modules.

In this manner, the module supported by the condenser air duct and the module supported by the evaporator air duct can be preassembled and then joined by connecting the elements of the piping system between the different components of the two modules.

A controller configured to control parameters of the system such as the rotational speed of the different fans and/or parameters of the compressor and/or the expansion device can be mounted and fully supported on an outside surface of the condenser air duct or of the evaporator air duct.

In particular, the controller can be arranged in such a manner that a heat sink structure of the controller, e.g. an arrangement of heating fins, protrudes into the interior of the air duct on which it is supported, e.g. of the condenser air duct. In this manner, the electronic components of the controller can also be cooled by the air flowing through the respective air duct.

Alternatively, the controller can be cooled by the refrigerant or by an additional air flow.

In order to mount the other components of the system, the condenser air duct and/or the evaporator air duct can each comprise a respective arrangement of mounting protrusions, preferably formed in one piece with the corresponding air duct. These mounting protrusions can in particular be formed as embossments or mounting eyelets.

In particular, the evaporator unit or at least the evaporator radiator can be supported on the condenser air duct by way of a console and/or a strut.

Preferably, the condenser air duct and/or the evaporator air duct are made from a fiber composite material such as a carbon fiber reinforced polymer or a glass fiber reinforced polymer.

According to a particular embodiment, the evaporator air duct can comprise two separate air inlets and a mixing chamber upstream of the evaporator radiator. Recirculated air from the cabin and fresh air from outside the aircraft can be introduced into the mixing chamber via the separate air inlets in order to make sure that the cooled cabin air at the outlet of the evaporator unit contains sufficient fresh air and not too much $CO_2$.

According to an alternative embodiment, a mixing chamber can be provided separately from the VCR-system and be connected to the evaporator unit.

Conveying a significant amount of air requires large cross sections of the air ducts, and consequently volumes, which are sufficient to be used as a backbone for a component aggregation.

According to some embodiments, the cross-section of the condenser radiator is different from, in particular larger than that of the condenser fan so that the condenser air duct connecting the condenser radiator to the condenser air duct is tapered and has a resulting inclined surface portion. Inclined in this context means in particular inclined with respect to a central axis of the condenser fan.

A compact arrangement of the different components can be achieved by supporting the compressor on this inclined surface portion of the condenser air duct and arranging the compressor between the condenser unit and the evaporator unit.

Finally, protection is also claimed for an aircraft comprising a vapor cycle refrigeration system according to the invention as described above, wherein the vapor cycle refrigeration system is fixed to the aircraft in such a manner that all components of the vapor cycle refrigeration system are supported on the aircraft via at least one of the condenser air duct and the evaporator air duct.

In the following, the present invention is explained by way of an exemplary embodiment illustrated in the appended figures. Therein:

FIG. 1 schematically illustrates the principle of vapor cycle refrigeration.

FIG. 4 is a left side view of the subject matter of FIG. 2, and

FIG. 5 is a right side view of the subject matter of FIG. 2.

Figure 1:
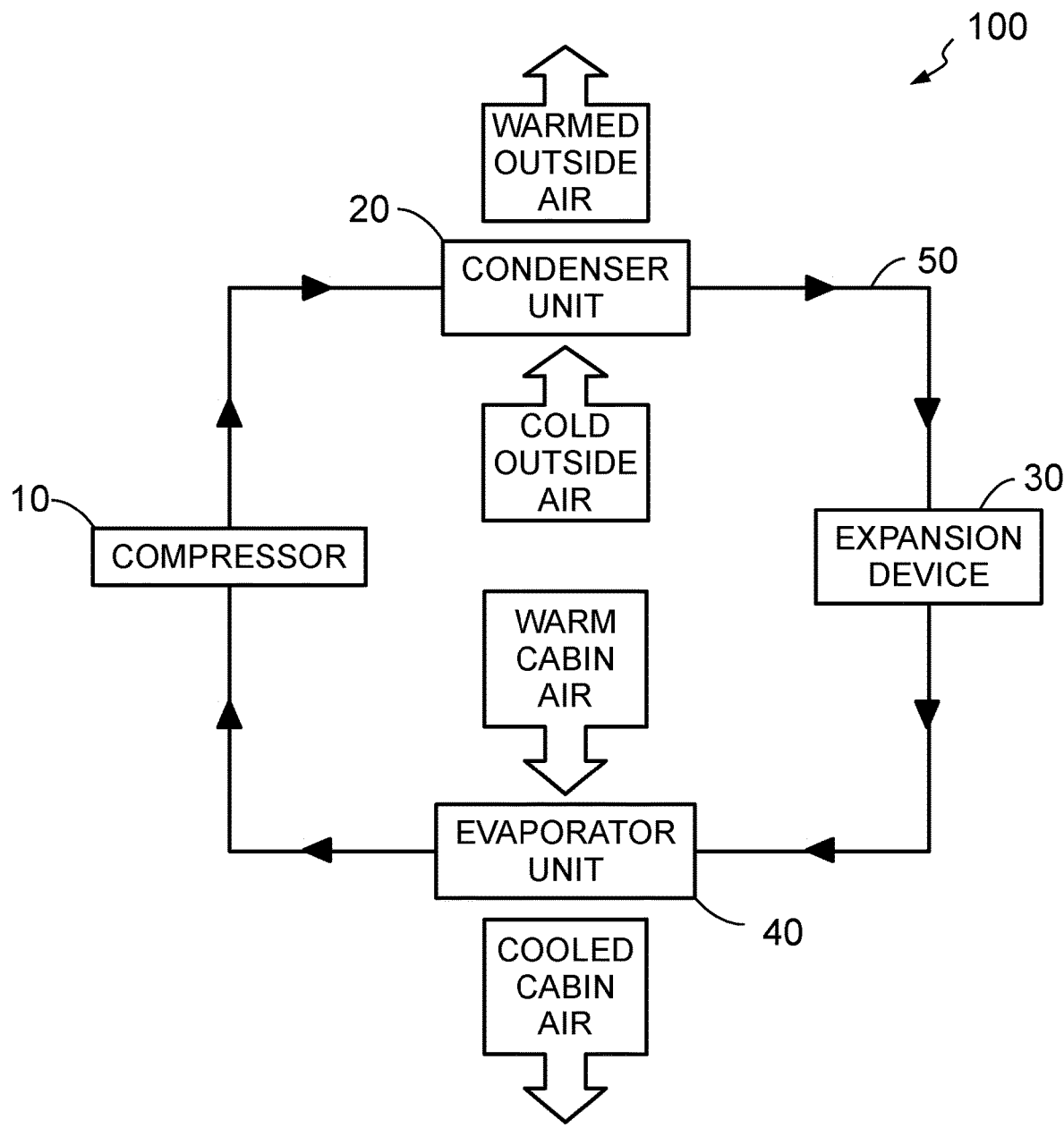
Figure 2:
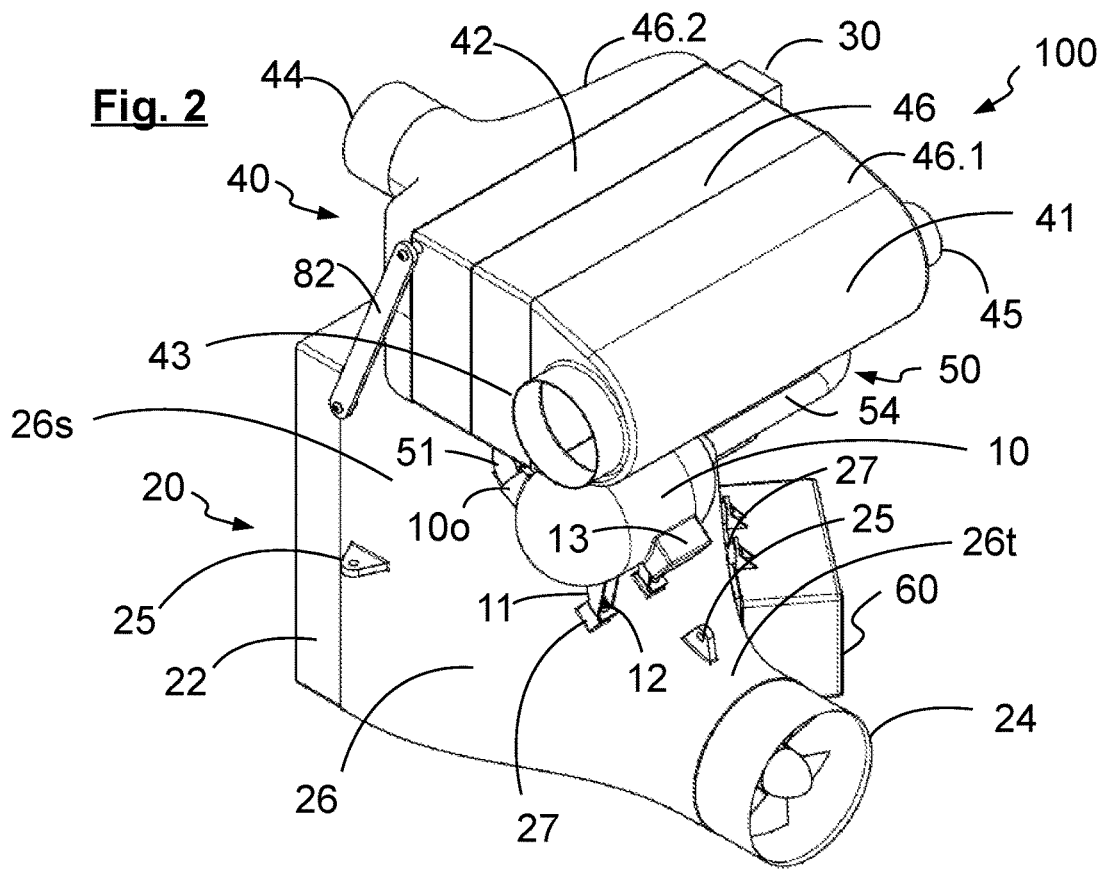
FIG. 2 is a perspective view of a VCR system according to an embodiment of the invention.

The principle of vapor cycle refrigeration as schematically illustrated in FIG. 1 applies both to conventional systems and to those according to the present invention.

The vapor cycle refrigeration system 100 as illustrated in FIG. 1 is a closed loop system and comprises at least a compressor 10, a condenser unit 20, an expansion device 30 and an evaporator unit 40, the elements listed above being connected to each other by a piping system 50 indicated by arrow lines in FIG. 1, wherein the arrowheads indicate the circulating direction of refrigerant.

The refrigerant, e.g. tetrafluoroethane, in a liquid state is evaporated in the evaporator unit 40 or, to be more precise, in an evaporator radiator thereof. The necessary energy for this phase transition is extracted in the form of heat from cabin air directed along the outer surfaces of the evaporator radiator coils. In this manner, the air is cooled and supplied to the cabin.

Pressure and temperature of the resulting refrigerant gas are then increased by the compressor 10. Afterwards, the gaseous refrigerant condenses in the condenser radiator of the condenser unit 20 which is cooled by outside air.

The resulting liquid refrigerant exiting the condenser unit 20 enters an expansion device 30, in particular a thermal expansion valve, where the pressure of the liquid is lowered before it re-enters the evaporator unit 40 and the cycle starts again.

The different components of the system, in particular the compressor and the radiators, are rather heavy. In conventional systems, the individual components are therefore arranged on a separate frame or in a separate box, wherein the frame or box supporting the components is then fixed to the aircraft.

A VCR-system 100 according to an embodiment of the invention which allows for a significant weight reduction is illustrated in FIGS. 2 to 5. Features of the embodiment which are identical or correspond to those of the schematically illustrated system of FIG. 1 are designated with the same reference signs.

For reasons of clarity, not each feature of the embodiment is provided with a reference sign in each of the Figures, in particular if there are several identical features.

In the embodiment illustrated in FIGS. 2 to 5, all components of the VCR-system 100 are supported directly or indirectly on the condenser air duct 26 of the condenser unit 20.

Figure 3:
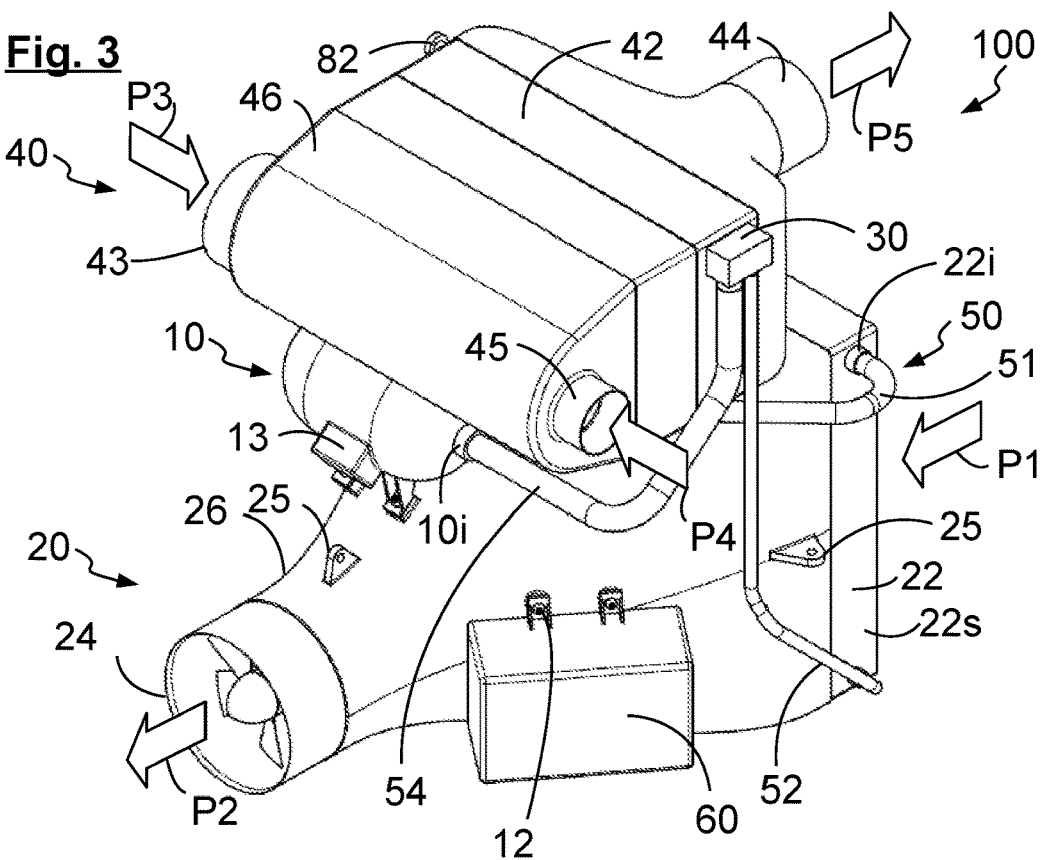
FIG. 3 is another perspective view of the subject matter of FIG. 2.

In this embodiment, the condenser air duct 26 is a roughly funnel-shaped hollow element made e.g. from a fiber reinforced composite material and connecting the condenser radiator 22 and the condenser fan 24 in such a manner that an air stream generated by the condenser fan 24 and entering the condenser unit 20 along direction P1 flows through the condenser radiator 22 along the outer surfaces of the internal cooling coils thereof (not shown), passes the condenser air duct 26 and leaves the condenser outlet 29 along direction P2 as shown in FIG. 3.

The cross-section of the condenser air duct 26 tapers from its first end 26e1 (cf. FIG. 4) connected to the condenser radiator 22 to its second end 26e2 connected to the condenser fan 24 while its cross-sectional form smoothly changes from rectangular to circular.

The condenser radiator 22 and the condenser fan 24 can be fixed in any suitable manner to the condenser air duct 26, e.g. by bolting (not shown).

Three mounting eyelets 25 project from an outer surface of the condenser air duct 26 and are preferably formed in one piece therewith, two being provided on opposed side wall portions 26s (cf. FIG. 2) of the condenser air duct 26 near the condenser radiator 22 and one being provided on a top wall portion 26t near the condenser fan 24.

These mounting eyelets 25 are used to fix the VCR-system 100 to an aircraft (not shown). Shape, location, orientation and number of eyelets are usually part of a system's adaption to an aircraft.

In order to mount other components, the condenser air duct 26 can comprise several arrangements of mounting protrusions 27.

In particular, in the present example, four mounting protrusions 27 in the form of raised embossings 27e, in particular with an internal thread, are formed in one piece with the condenser air duct 26 on an inclined upper surface portion 26i thereof (cf. FIG. 4) in order to fix and support the compressor 10.

Two similar protrusions 27 are provided on a sidewall portion 26s of the condenser air duct 26 to mount a controller 60 used to control several parameters of the VCR-system 100.

A heat sink structure, e.g. an arrangement of heating fins (not shown) protrudes through an opening (not shown) in a side wall of the condenser air duct 26 so that the electronic components of the controller 60 can also be cooled by the air streaming through the condenser air duct 26.

Finally, in order to support the evaporator unit 40, the condenser air duct 26 can comprise two mounting protrusions 27, only one of which is visible in FIG. 4, that are spaced from each other in a lateral direction perpendicular to the drawing plane of FIG. 4 and have the form of triangular eyelets 27t similar to the mounting eyelets 25 described above.

The condenser radiator 22 is fixed to the first end 26e1 of the condenser air duct 26 and comprises an inlet 22i and an outlet 22o for the refrigerant which are provided on the upper and lower end of a sidewall 22s of the condenser radiator 22.

The condenser radiator inlet 22i is connected to an outlet 10o of the compressor 10 by way of a pipe 51 running at least partly in the space between the inclined upper wall portion 26i of the condenser air duct 26 and a bottom wall 40b of the evaporator unit 40 and visible best in FIGS. 4 and 5.

The condenser radiator outlet 22o is connected to an inlet 30i of the expansion device 30 by way of a pipe 52 running upwards first along a side wall portion 26s of the condenser air duct 26 and then along a side wall portion 42s of the evaporator radiator 42.

The expansion device 30, preferably comprising a thermal expansion valve, fixed to the sidewall portion 42s of the evaporator radiator 42 and is internally connected to the cooling coils thereof (not shown).

The evaporator unit 40 is mounted to the inclined upper surface portion 26i of the condenser air duct 26 by way of two mounting protrusions 47 in the form of triangular eyelets 47t provided on the bottom wall 40b that are fixed to corresponding mounting protrusions 27 of the condenser air duct 26 via fasteners 81 (cf. FIG. 4).

Additionally, the evaporator unit 40 is supported on the condenser air duct 26 by way of a diagonal strut 82 connecting an upper end portion of a side wall 42s of the evaporator radiator 42 opposed to the side wall on which the expansion device 30 is mounted to an upper side wall portion of the condenser air duct 26 near the condenser radiator 22. The diagonal strut 82 prevents the evaporator unit 40 from pivoting around the axis defined by the fasteners 81 (cf. FIG. 4) and thus fixes the orientation of the evaporator unit 40 with respect to the condenser unit 20.

The evaporator air duct 46 comprises a first part 46.1 arranged upstream of the evaporator radiator 42 and a second part 46.2 arranged downstream of the evaporator radiator 42 and connecting the evaporator radiator 42 to the evaporator fan 44. The first part 46.1 of the evaporator air duct 46, the evaporator radiator 42, the second part 46.2 of the evaporator air duct 46 and the evaporator fan 44 can be fixed to each other by any suitable means, e.g. by bolting (not shown).

The first part 46.1 of the evaporator air duct 46 comprises a mixing chamber 41 with two circular air inlets 43 and 45 provided on opposite sidewall portions of the mixing chamber 41. One of the inlets, in particular the larger inlet 43, can be used to introduce warm recirculated cabin air along direction P3 into the mixing chamber 41, the other inlet, in particular the smaller inlet 45 can be used to introduce fresh air from outside the aircraft along direction P4 into the mixing chamber 41.

Heat is removed from the resulting mixed air when it is directed along the outer surfaces of the internal coils (not shown) of the evaporator radiator 42 and used to evaporate the liquid refrigerant flowing through the coils. The resulting cooled air is drawn through the bottleneck-shaped second part 46.2 of the evaporator air duct 46 by the evaporator fan 44 leaves the evaporator unit 42 along direction P5.

In the present embodiment, the refrigerant, after having been vaporized in the evaporator radiator 42, leaves the evaporator unit 40 via an outlet 300 that can be provided in the expansion device 30 and that is connected to an inlet 10i of the compressor 10 by way of a pipe 54. The internal connection between an outlet of the evaporator radiator 42 and the outlet 300 of the expansion device 30 is not visible in the figures.

The compressor 10 has a conventional spherocylindrical form and comprises four legs 11 fixed to the four mounting protrusions 27 that are provided on the inclined upper portion 26i of the condenser air duct 26 with suitable fasteners 12. The compressor 10 can comprise a connector 13 for electrical power and/or data.

The piping system 50 comprises pipes 51, 52 and 54 described above and can comprise suitable vibration absorbers (not shown).

The condenser air duct 26 preferably made from a fiber reinforced composite material is light-weight yet structurally stable and large enough to support all the other components of the system 100 so that a separate frame or box can be dispensed with. The resulting self-supporting VCR system 100 is compact and considerably reduced in weight in comparison to conventional systems with a separate frame or box supporting the different components.

The invention claimed is:

1. A vapor cycle refrigeration system for an aircraft, the system comprising:
    a compressor,
    a condenser unit with a condenser radiator, a condenser fan and a condenser air duct configured to direct a stream of air generated by the condenser fan through the condenser radiator,
    an expansion device,
    an evaporator unit with an evaporator radiator, an evaporator fan and an evaporator air duct configured to direct a stream of air generated by the evaporator fan through the evaporator radiator, and
    a piping system connecting the compressor, the condenser radiator, the expansion device and the evaporator radiator in a closed circuit for a refrigerant,
    wherein each of the compressor, the condenser radiator, the condenser fan, the expansion device, the evaporator radiator, the evaporator fan and the piping system is fully supported directly or indirectly by at least one of the condenser air duct and the evaporator air duct in such a manner that the system is self-supporting.

2. The vapor cycle refrigeration system according to claim 1, wherein each of the compressor, the condenser radiator, the condenser fan, the expansion device, the evaporator radiator and the evaporator fan is fully supported either by the condenser air duct or by the evaporator air duct so that the system is separable into two self-supporting modules.

3. The vapor cycle refrigeration system according to claim 1, furthermore comprising a controller mounted to and fully supported on an outside surface of the condenser air duct or on an outside surface of the evaporator air duct.

4. The vapor cycle refrigeration system according to claim 3, wherein a heat sink structure of the controller protrudes into the interior of the air duct on which the controller is supported, in particular into the interior of the condenser air duct.

5. The vapor cycle refrigeration system according to claim 1, wherein the condenser air duct and/or the evaporator air duct comprise an arrangement of mounting protrusions for mounting other components of the system, the mounting protrusions preferably being formed in one piece with the corresponding air duct.

6. The vapor cycle refrigeration system according to claim 1, wherein the evaporator unit is supported on the condenser air duct by way of a console and/or a strut.

7. The vapor cycle refrigeration system according to claim 1, wherein the condenser air duct and/or the evaporator air duct are made from a fiber composite material.

8. The vapor cycle refrigeration system according to claim 1, wherein the evaporator air duct comprises two separate air inlets and a mixing chamber upstream from the evaporator radiator.

9. The vapor cycle refrigeration system according to claim 1, wherein the compressor is supported on an inclined surface portion of the condenser air duct and is arranged between the condenser unit and the evaporator unit.

10. An air craft comprising a vapor cycle refrigeration system according to claim 1, wherein the vapor cycle refrigeration system is fixed to the air craft in such a manner that all components of the vapor cycle refrigeration system are supported on the aircraft via at least one of the condenser air duct and the evaporator air duct.

\* \* \* \* \*